April 3, 1945.   E. MORF   2,372,972
SHOCK ABSORBING BEARING
Filed May 8, 1944   2 Sheets-Sheet 1

Inventor
E. Morf
By [signature]
Attys

April 3, 1945.                E. MORF                2,372,972
                        SHOCK ABSORBING BEARING
                      Filed May 8, 1944          2 Sheets-Sheet 2

Patented Apr. 3, 1945

2,372,972

UNITED STATES PATENT OFFICE 2,372,972

SHOCK ABSORBING BEARING

Ernest Morf, La Chaux-de-Fonds, Switzerland

Application May 8, 1944, Serial No. 534,601
In Switzerland March 22, 1943

4 Claims. (Cl. 58—140)

This invention relates to shock-absorbing bearings for a movable part of time indicators in which the pierced jewel has a special form: its hole is at such a distance from the points of support of the jewel upon the movement that a lateral force exerted on the pivot of the movable part tilts the jewel around its lower edge against the effect of a spring tending to bring the jewel back into correct position. The bearing in question therefore comprises neither cones nor elastic devices to the centre of which the jewel is fixed.

The expression "pierced jewel" means in this case an element in which the pivot of the movable part to be protected rotates. The material used for manufacturing this element must not absolutely consist of natural or synthetic jewel. It may also be a metal susceptible of being hardened by a thermic treatment, such as for instance steel or an alloy of copper and beryllium. In these two latter cases the element in question can be obtained by cutting; its manufacture can thus be rendered exact and uniform.

The enclosed drawings illustrate, by way of example, two embodiments of the bearing according to the invention.

Figure 1:
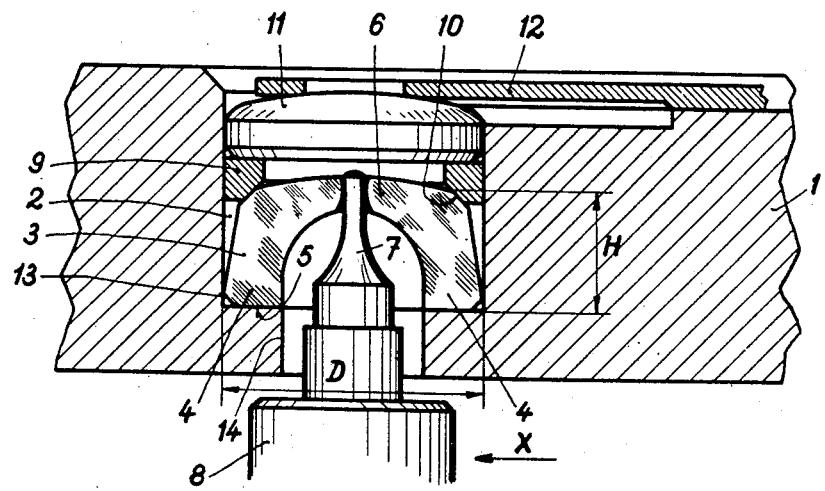
Fig. 1 is a section through the axis of the movable part to be protected, the device being in normal position.
Figure 2:
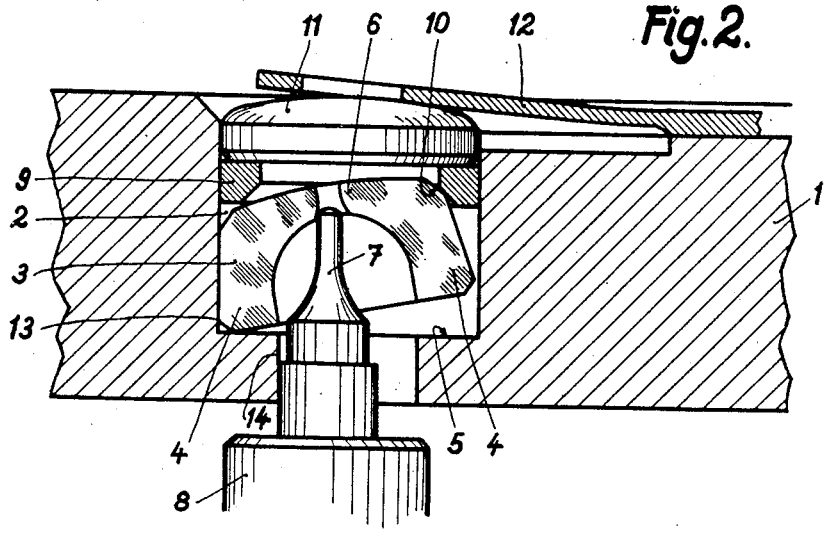
Fig. 2 is a similar section, but with the different parts in their maximally displaced position into which they are brought by a violent shock.

Referring now to Figs. 1 and 2, the plate forming part of a watch movement is designated by the reference character 1. It has a recess 2 against the bottom of which bears a jewel 3, the cross-section of which has the form of a horseshoe which rests with the legs 4 on the bottom 5 of the recess 2. The middle portion 6 of the jewel 3 is pierced through by a rounded hole receiving the pivot 7 of the movable part 8 to be protected. A ring 9, bevelled on its inside, bears against a chamfer 10 on the upper part of the jewel 3.

On the ring 9 a cap-jewel 11 is supported and pressed against this ring 9 by a spring 12 fixed to the plate 1. Therefore the spring 12 holds the jewel 3 indirectly in the position shown in Fig. 1, i. e., on the bottom of the recess.

The dimensions of the jewel 3 are so that the ratio between its greatest outer diameter D and its height H is in the order of 2:1. Under these conditions, when the piece comprising the bearing is submitted to the effect of a shock having, for instance, the direction of the arrow X, the pressure of the pivot 7 upon the jewel 3 tilts the latter around the edge 13 and brings the outer side surface into contact with the side wall of the recess 2 the position being represented in Fig. 2. The reduced end of the axle 8 then bears against the wall 14 of the opening which communicates with the bottom 5 of the recess 2 and through which this axle passes.

When the effect of the shock ceases, the spring 12 brings all the parts back into the exactly centered position shown in Fig. 1. The ring 9 may even have a round cross-section.

Figure 3:
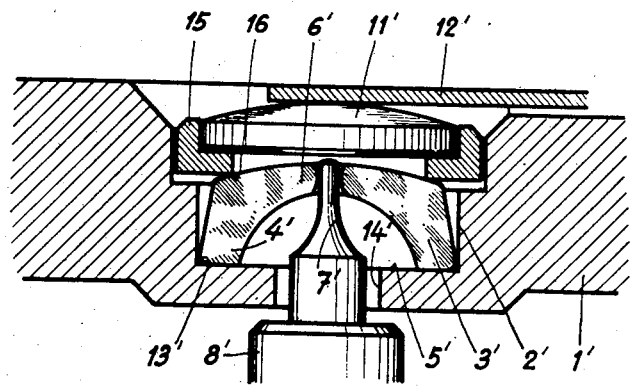
Figs. 3 and 4 are sections corresponding to those in Figs. 1 and 2 but of the second embodiment.
Figure 4:
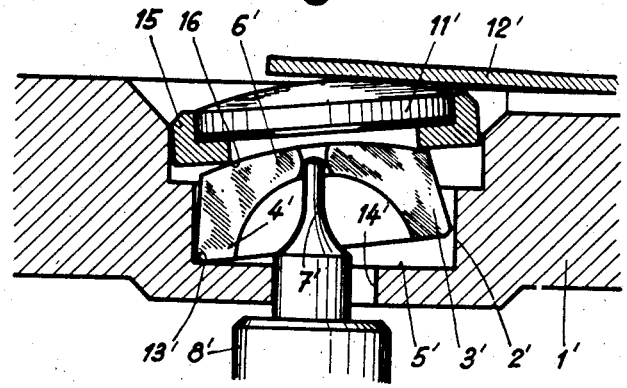

Referring now to Figs. 3 and 4, this embodiment comprises all the parts used in the first example. Here, however, the upper part of the jewel 3', the cross-section of which has the form of a horseshoe comprising legs 4' and a middle part 6', is spherical. On this upper part the setting 15 of a cap jewel 11' is supported. Only the inner edge 16 of this setting 15 makes contact with the spherical part of the jewel 3' and transmits the pressure of the spring 12' to this jewel.

When the piece on which the shock-absorber is mounted receives a shock, for instance in the direction of the arrow shown in Fig. 4, the pivot 7' of the movable part 8' exerts a lateral pressure on the jewel 3' and tilts this latter around the edge 13' until it contacts the wall of the recess 2' and the pivot bears against the wall 14' of the opening which passes through the bottom of the recess 2'.

The shock-absorber according to Figs. 3 and 4 has, therefore, but two elements: a cap jewel mounted on a setting and a pierced jewel.

The walls of the recess 2 may be inclined in such a manner that the recess 2 is widened towards the top. In this way more space for an eventual displacement of the pierced jewel may be provided.

What I claim is:

1. In a time indicator, a shock-absorbing bearing, a movement including a movable part mounted in said shock absorbing bearing, said bearing comprising a plate having an opening for the movable part and having a recess provided thereabout, a jewel mounted in the recess and provided with a hole, a spring in operating relation with said jewel, said hole being at such a distance from the points of support of said jewel in the recess that a lateral force exerted on said movable part tilts said jewel around its lower edge until the jewel contacts the wall of the recess and against the effect of said spring tending to bring said jewel back into the correct position.

2. In a time indicator according to claim 1, a ring disposed to hold in place said jewel with a section having the form of a horse-shoe and a cap jewel in operating relation with said spring in order to be pressed against said ring.

3. In a time indicator according to claim 1, the ratio between the diameter and the height of said jewel being in the order of 2:1.

4. In a time indicator according to claim 1, a setting disposed to hold in place said jewel with a section having the form of a horse-shoe and a cap-jewel fixed to said setting, said cap-jewel being in operating relation with said spring in order that said setting be pressed against said jewel.

ERNEST MORF.